(12) United States Patent
Cieślikowski et al.

(10) Patent No.: US 8,967,370 B2
(45) Date of Patent: Mar. 3, 2015

(54) UNIT FOR CONVEYING FILTER SEGMENTS

(75) Inventors: Bartosz Cieślikowski, Radom (PL);
Ryszard Dominiak, Radom (PL);
Marcin Mamerski, Radom (PL);
Leszek Sikora, Radom (PL)

(73) Assignee: International Tobacco Machinery Poland SP. Z O.O., Radom (PL)

( * ) Notice: Subject to any disclaimer, the term of this patent is extended or adjusted under 35 U.S.C. 154(b) by 0 days.

(21) Appl. No.: 14/114,801

(22) PCT Filed: May 22, 2012

(86) PCT No.: PCT/PL2012/050012
§ 371 (c)(1),
(2), (4) Date: Nov. 18, 2013

(87) PCT Pub. No.: WO2012/161604
PCT Pub. Date: Nov. 29, 2012

(65) Prior Publication Data
US 2014/0076694 A1  Mar. 20, 2014

(30) Foreign Application Priority Data

May 23, 2011 (PL) .......................................... 394995

(51) Int. Cl.
*B65G 19/02* (2006.01)
*A24D 3/02* (2006.01)

(52) U.S. Cl.
CPC .............. *B65G 19/02* (2013.01); *A24D 3/0287* (2013.01)
USPC ......................................... 198/729; 198/730

(58) Field of Classification Search
CPC .............................. B65G 19/02; A24D 3/0287
USPC ..................................... 198/717–733; 493/39
See application file for complete search history.

(56) References Cited

U.S. PATENT DOCUMENTS

| 3,009,557 | A | * | 11/1961 | Jackson | 198/433 |
| 3,973,669 | A | * | 8/1976 | Tabler | 198/727 |
| 4,287,979 | A | | 9/1981 | Molins et al. | |
| 4,349,099 | A | * | 9/1982 | Wiknich et al. | 198/751 |
| 4,411,640 | A | | 10/1983 | Hall | |
| 5,911,303 | A | * | 6/1999 | Malanowski | 198/731 |
| 7,578,777 | B2 | * | 8/2009 | Draghetti et al. | 198/428 |
| 8,475,348 | B2 | * | 7/2013 | Yanchev et al. | 493/39 |

FOREIGN PATENT DOCUMENTS

| GB | 915203 A | 1/1963 |
| WO | 2009/074540 A1 | 6/2009 |

OTHER PUBLICATIONS

International Search Report for International Application No. PCT/PL2012/050012 mailed Nov. 28, 2012.
Written Opinion for International Application No. PCT/PL2012/050012 mailed Nov. 28, 2012.

* cited by examiner

*Primary Examiner* — James R Bidwell
(74) *Attorney, Agent, or Firm* — Oppedahl Patent Law Firm LLC

(57) ABSTRACT

The object of the invention is a unit for conveying filter segments (2) for the machines of tobacco industry, comprising a chain conveyor (10) in a horizontal arrangement on which the lugs (21) are disposed, the working ends (28) of which are deflected from the vertical. The unit comprises guides (23, 33) of the filter segments (2) provided with an inclined channel (27) guiding the lug (21).

4 Claims, 3 Drawing Sheets

UNIT FOR CONVEYING FILTER SEGMENTS

BACKGROUND

The object of the application is a unit for conveying filter segments for the machines of the tobacco industry, in particular for manufacturing multi-segment filters for cigarettes.

One of known methods of manufacturing multi-segment filters is placing individual filter segments onto a grouping tape, whereas the said segments are pushed down in order to form a continuous filter segment stream which after wrapping into cigarette paper is cut into multi-segment rods. The said segments are delivered by modules in which the filter rods are cut on multi-flute cutting drums into filter segments which, in the form of sets of segments, are conveyed by lugs in the direction of the grouping tape. From the patent GB 915 203, a module delivering filter segments is known wherein the sets of filter segments are conveyed by vertically positioned lugs and the said lugs move along slots above which filter segments in the form of sets of segments move, whereas the lugs are mounted on a chain situated in a vertical plane. From the publication WO2009074540, a module is known wherein the lugs for conveying the sets of segments are mounted on a chain situated in a horizontal plane.

A problem which filter manufacturers have to deal with is damaging filter elements conveyed by lugs, the working elements of which are situated vertically, that is when the segments are conveyed above the channels in the form of slots along which the lugs are guided, which occurs most frequently when the plane in which the chain works is situated vertically. The segments move then on sharp edges of the guiding channel, which can lead to damage of the segments. In addition, if the cigarette paper wrapping the filter material is not perfectly glued, a deflected part of the cigarette paper easily slides into the slot, which can lead to a blockage of the segments or to the destruction thereof, whereas the blockage of fed segments can lead to the damage or deformation of the lugs.

SUMMARY

The object of the invention is a unit for conveying filter segments for the machines of the tobacco industry, comprising a chain conveyor in a horizontal arrangement on which the lugs are disposed.

A unit according to the invention is characterized in that the working end of the lug is deflected from the vertical, and in addition comprises guides of filter segments provided with an inclined channel guiding the lug.

A unit according to the invention is characterized by additionally comprising a unit detecting the position of the working end of the lug.

A unit according to the invention is characterized in that the lugs can be dismounted from the chain conveyor without the necessity of opening the chain.

A favorable effect of using the invention is shifting the point of contact of a guided filter segment from the edge of a channel guiding a lug to a flat surface. In the solution according to the invention the filter segments are guided along three smooth walls of a guide, which allows avoiding the contact of a filter segment with the sharp edge of the channel guiding the lug. If the cigarette paper is not correctly glued, the risk that an unstuck fragment of the cigarette paper slides into the guiding slot is clearly reduced. A unit according to the invention allows detecting of deformations of all lugs e.g. before the start of the machine, which eliminates the risk of damage to the elements of the machine if it is started at the moment when the lugs are damaged or deformed. In addition, a fast replacement of a lug without the necessity of dismounting the chain is possible.

BRIEF DESCRIPTION OF THE DRAWINGS

The object of the invention is shown in a preferred embodiment in a drawing in which.

DETAILED DESCRIPTION

Figure 1:
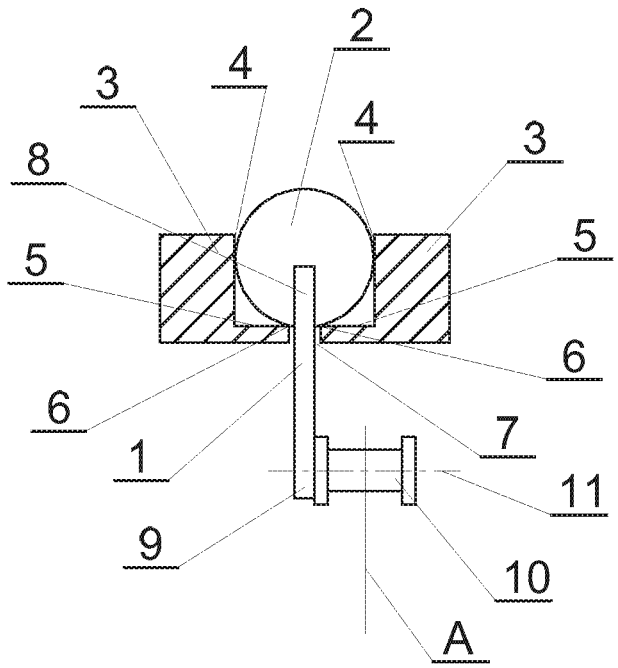
FIG. 1—shows a view of the guides of a filter segment known in the state of the art in a cross-section and a known lug mounted on a chain guided in a vertical arrangement, FIG. 2—a view of the guides of a filter segment known in the state of the art in a cross-section and a lug mounted on a chain guided in a horizontal arrangement, FIG. 3—a view of the guides of a filter segment in a cross-section and a lug according to the invention, FIG. 4—a view of the guides of a filter segment in a cross-section and a lug according to the invention, FIG. 5—a top view of the path of a chain conveyor with the shown detection zone of the end of a lug, FIG. 6—a simplified perspective view of a lug with a fastening element.

FIG. 1 shows a lug 1 known in the state of the art, fastened to a chain working in a vertical arrangement, used in units for conveying filter segments. The lug 1 drags and pushes filter segments 2 along guides 3, whereas the plane of the drawing is principally perpendicular to the direction of movement of the lug 1 and the segment 2, and the motion of the segments takes place in a horizontal plane. The guides 3 have surfaces 4 being lateral guides of the segment 2 and surfaces 5 being bottom guides of the segment 2. The surfaces 5 on the side of the lug 1 terminate in edges 6 which restrict the space of a guiding channel 7 in the form of a slot along which the lugs 1 move. A working end 8 of the lug 1 which comes into contact with the segment 2 moves above the slot 7, whereas a gripping part 9 moves beneath the slot 7, with the gripping part 9 being fastened to a link of a chain conveyor 10. The drive chain of the lugs is a closed loop, and the axis of rotation 11 of each of the pins of the chain conveyor is situated perpendicular to a vertical plane A, in other words the chain is guided in a vertical arrangement.

Figure 2:
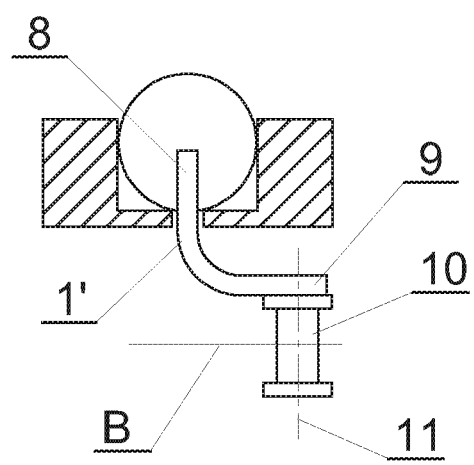

FIG. 2 also shows a known lug 1', whereas the chain is guided in a horizontal arrangement. The gripping part 9 of the lug 1' is fastened to a link of the chain conveyor 10, whereas the axes of rotation 11 of each of the pins of the chain conveyor are situated vertically perpendicular to a horizontal plane B, in other words the chain conveyor is guided in a horizontal arrangement.

Figure 3:
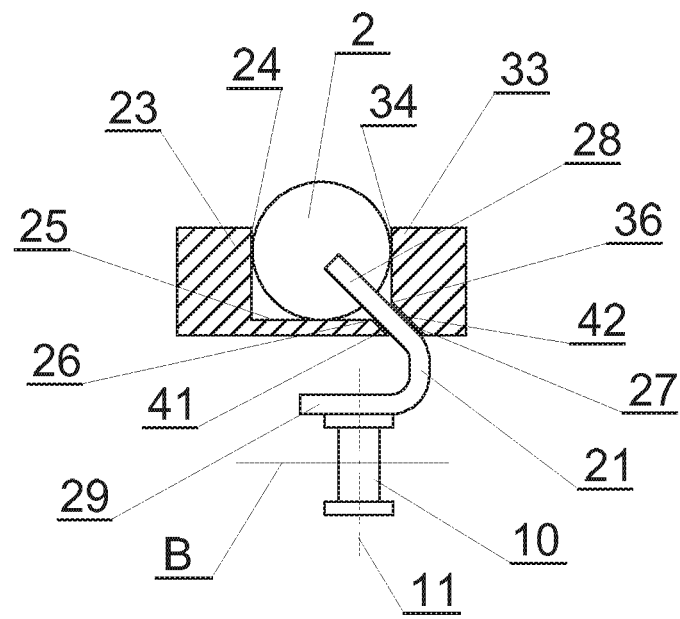

FIG. 3 shows a solution according to the invention wherein a segment 2 is dragged and pushed by a lug 21, whereas the segment 2 is guided between guides 23 and 33. The guides 23 and 33 have surfaces 24 and 34 being lateral guides of the segment 2. From below the segments are guided along a surface 25 belonging to the guide 23 and being the bottom guide of the segment. The guides 23 and 33, which can be constructed as one element, have surfaces 41 and 42, respectively, constituting guides of the lug 21, whereas the surfaces 41 and 42 form a guiding channel 27 along which a working end 28 of the lug 21 moves, with the said working end being deflected from the vertical. The surfaces 41 and 42 intersect with the surfaces 25 and 34, respectively; the edges 26 and 36 lying along the intersection of the said surfaces are situated in the corner of a channel along which the filter segments 2 are guided and they do not come into contact with the segments 2.

In a solution according to the invention wherein the working end 28 of the lug 21 is deflected from the vertical, the segments 2 are guided only along the smooth surfaces 24, 25 and 34 which constitute the guides of the segments 2. A horizontally situated gripping part 29 of the lug is fastened to a chain conveyor working in a horizontal arrangement, the axes 11 of the pins of the chain conveyor 10 are situated perpendicular to the horizontal plane B.

Figure 4:
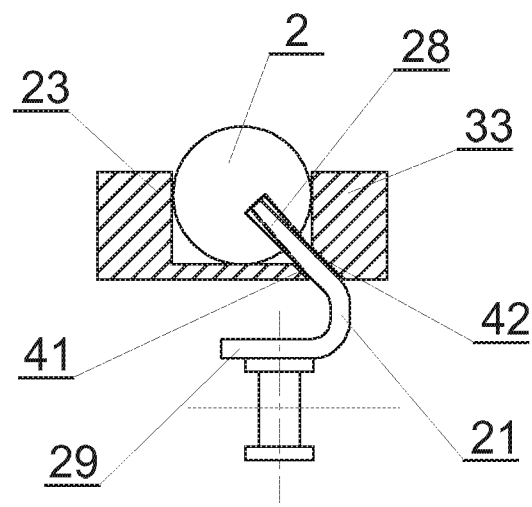
Figure 5:
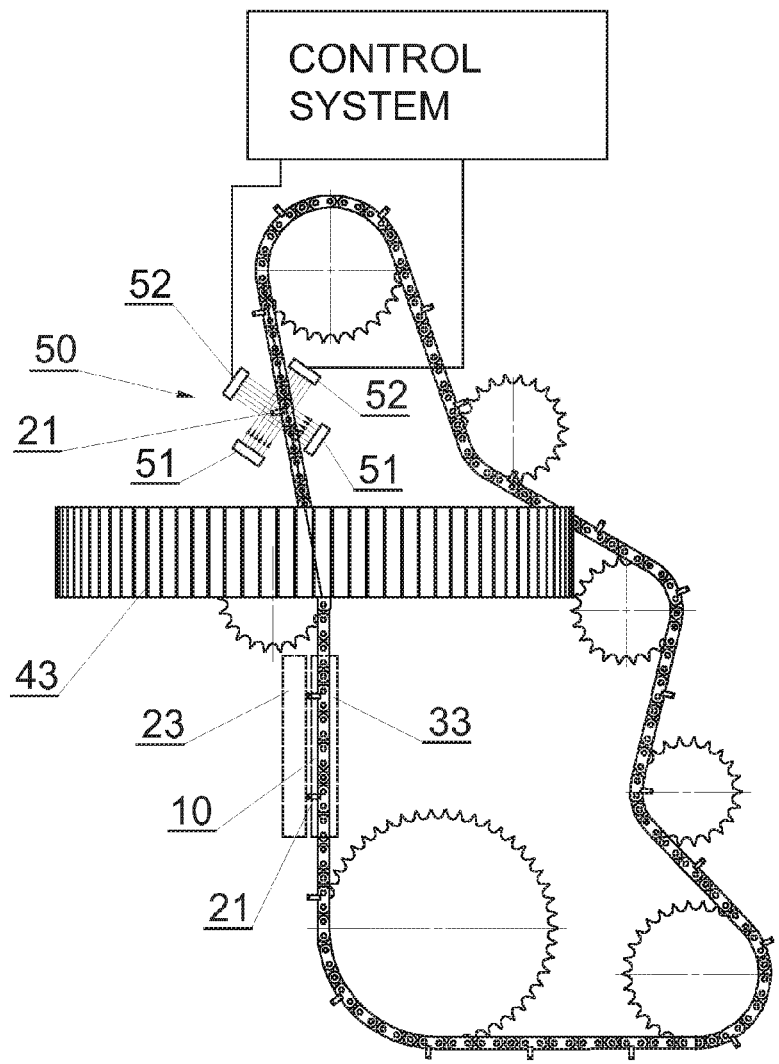

Despite the lugs are guided in the channel 27 in the area of the greatest danger of deformation of the lugs, that is beneath a cutting drum 43 (FIG. 5) from the flutes of which cut filter rods in the form of filter segments are fed, the lugs 21 disposed on the chain conveyor can be exposed to incidental untypical loads in different places of the path of motion of the lugs 21 and the chain conveyor 10 as a result of which the working ends 28 can be damaged or deformed. A example of a deformation of the working end 28 is shown in FIG. 4 in broken lines. Deformations of the working end 28 can affect the correct operation of the machine for manufacturing multi-segment filters, they can be also a source of damage to the machine. FIG. 5 shows the path of motion of the chain conveyor 10 with the lugs 21 which is determined by circles around which the chain 10 is guided and a fragment of the guides 23 and 33 shown in broken lines. In a unit for conveying the segments according to the invention, for example optical elements for the detection of positions of the working end of the lug are disposed. The working end 28 is illuminated by a illuminating element 51 (FIG. 5) in the area of detection 50, whereas a receiver 52 is an element which collects information about the shape of the working end 28 of the lug 21. The receiver 52 can be constructed as a matrix of known light-sensitive elements, whereas the control system can have stored model image of the shape of the working end 28 with which the images created on the receiver 52 will be compared. For instance, the area 50 of detection of the position of the working end 28 of the lug 21 can comprise at least two sets of kits consisting of the illuminating element 51 and the receiver 52. The chain of the unit for conveying the segments can move along its path of motion, feeding successive lugs 21 into the area 50 in order to record the images of the working ends 28 of all lugs 21, collect and analyze them in the control system, as well as to report faults. If any deformations of the working ends 28 of the lugs 21 are detected, a further operation will be possible for example only after the replacement of a damaged or deformed lug.

Figure 6:
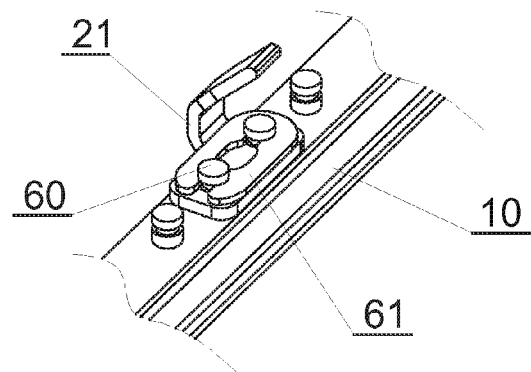

FIG. 6 shows a simplified representation of a chain 10 with pins 60 onto which a lug 21 is put. The lug 21 is fastened from above by means of a clip 61 put onto the pins 60. Such fastening method allows the replacement of the lugs 21 without opening the chain 10.

The invention claimed is:

1. A unit for conveying filter segments in machines of the tobacco industry, comprising:
    a chain conveyor in a horizontal arrangement on which lugs are disposed, characterized in that:
    the lug has a working end; and
    a working end (28) of the lug (21) is deflected from the vertical;
    the unit comprises guides (23, 33) of filter segments (2) provided with an inclined channel (27) guiding the lug (21).

2. A unit as in claim 1, characterized in that it additionally comprises a unit (50) detecting a position of said working end (28) of the lug (21).

3. A unit as in claim 1, characterized in that the lugs (21) can be dismounted from the chain conveyor (10) without the necessity of opening the chain.

4. A unit as in claim 2, characterized in that the lugs (21) can be dismounted from the chain conveyor (10) without the necessity of opening the chain.

* * * * *